Patented Dec. 9, 1941

2,265,242

UNITED STATES PATENT OFFICE 2,265,242

PREPARATION OF ETHENOID RESINS

Barnard M. Marks, Upper Montclair, N. J., assignor to E. I. du Pont de Nemours & Company, Wilmington, Del., a corporation of Delaware No Drawing. Application July 29, 1939,
Serial No. 287,206

10 Claims. (Cl. 260—83)

This invention relates to improvements in ethenoid resins and, more particularly, to a process of removing therefrom polyacrylic or polyalkacrylic acids used as dispersing agents in the polymerization of liquid ethenoid monomers.

The present invention is particularly applicable to ethenoid polymers produced of polymerization of the monomers by the so-called "granulation" process. In this process, the liquid ethenoid monomer to be polymerized is dispersed in the form of droplets in an aqueous medium containing a buffering agent and a granulating agent, and the mixture, while being agitated, is subjected to a polymerizing influence, usually elevated temperature, whereby the droplets of monomeric compounds are converted to granules of solid polymer which are then separated from the aqueous medium, washed, and dried.

In the polymerization of certain ethenoid monomers by the granulation process, one of the most satisfactory granulating agents is polymethacrylic acid, the use of which for this purpose has been disclosed in U. S. Patent No. 2,133,257 granted Oct. 11, 1938 to Daniel E. Strain, and entitled "Polymerization process."

Polymethacrylic acid as granulating agent is in part adsorbed upon the granules of polymer and, although its presence in the resulting product is less objectionable than that of many other granulating agents, it does tend to impair somewhat the transparency of the resin, and to promote discoloration by heat. It is accordingly desirable that this dispersing agent, like others, be removed from the granules before they are further processed.

Washing with water does not effect this removal because the polymethacrylic acid is strongly adsorbed, nor is any benefit gained through the use of detergents which are, in fact, likely to introduce haze. The polymethacrylic acid can be removed by destruction by a washing with aqueous alkali but this does damage also to the resin itself and must, in turn, be removed therefrom.

The use of polyacrylic acid or the various homologues of polymethacrylic acid as dispersing agents presents substantially the same problems that the use of polymethacrylic acid does.

The present invention is directed to the effective removal of such polymethacrylic acid, and of its homologues, without damage to the resin. It is applicable also to the treatment of granular resins formed in accordance with the procedure of U. S. Patent 2,122,886, of Barnard M. Marks, in which the dispersing agent is constituted at least in part of a substance or substances formed in the course of the reaction of polymerization. In the process of this patent, the filtrate from one batch of polymer, of an ester of acrylic, methacrylic, or a homologous acid, is used to furnish dispersing agent for a subsequent batch. As more fully set forth in U. S. P. 2,122,886, it is believed that dispersing agent present in the filtrate is polymethacrylic acid derived from the methacrylic ester undergoing polymerization (or, correspondingly, polyacrylic acid, polyethacrylic acid, and so on, in the cases of polymerizations of esters of these acids), since the amount present in the filtrate is always more than enough for the polymerization of another batch in spite of the known adsorption of some of the dispersing agent upon the granules of the polymer.

It is an object of the present invention to provide a method of effecting thorough removal of polymethacrylic acid, polyacrylic, and other polyalkacrylic acids from granules of ethenoid resin polymers without damage to the quality of the latter, and by a process which is simple, inexpensive and readily controlled.

Other objects of the invention will appear hereinafter.

In accordance with the present invention these objects are accomplished by subjecting a granular resin, upon which such a dispersing agent is adsorbed, to treatment with an aqueous solution of an alkaline phosphate of an alkali metal, conveniently sodium hexametaphosphate or disodium phosphate, and then washing with distilled water and drying.

Specific embodiments of the present invention are illustrated in the following examples:

*Example I.*—A batch for the granulation polymerization of methyl methacrylate is made of:

| | Grams |
|---|---|
| Methyl methacrylate | 100 |
| Benzoyl peroxide | 1 |
| Distilled water | 350 |
| Buffer solution | 10 |
| Polymethacrylic acid | 1 |

The buffer solution contains:

| | |
|---|---|
| Disodium acid phosphate | 1.71 |
| Monosodium phosphate | 0.09 |

Balance distilled water.

The benzoyl peroxide is dissolved in the methyl methacrylate, and the resulting solution filtered. The polymethacrylate acid is dissolved in the distilled water and then the buffer solution added, and the resulting solution filtered. This aqueous vehicle has a pH of approximately 7.5.

The monomeric methyl methacrylate containing the dissolved benzoyl peroxide is added to the aqueous vehicle in a kettle provided with a stirrer and reflux condenser. The stirrer is operated at a speed sufficient to maintain the methyl methacrylate continuously in the form of droplets, and the mixture is heated to a temperature of 80–82° C. At the end of about 45 minutes polymerization is complete, and the little granules of polymer are separated from the aqueous vehicle.

The polymer is now agitated with a generous volume of an aqueous solution of sodium hexametaphosphate, 0.5% in strength, at 70° C., for 5 minutes. It is then separated from this solution, washed thoroughly with distilled water, and dried.

The polymer thus treated for the removal of granulating agent can be molded to articles of transparency and purity of color definitely superior to those made from similar polymer not treated for removal of granulating agent, or treated by methods heretofore known.

*Example II.*—The filtrate obtained in the separation of the polymer of Example I from the aqueous vehicle of the polymerization batch amounts to about 360 cc. This filtrate is used as a source of granulating agent in the polymerization of a second batch of methyl methacrylate, which is made up of:

| | |
|---|---|
| Methyl methacrylate | grams 100 |
| Benzoyl peroxide | do 1 |
| Filtrate | cc 180 |
| Distilled water | grams 175 |
| Buffer solution (as in Example I) | do 5 |

Polymerization is carried out under the same conditions as in Example I and is complete in about the same length of time. The resulting polymer is treated with an aqueous solution of sodium hexametaphosphate, 0.5% in strength, as was that of Example I, with equivalent results.

*Example III.*—A batch for the granulation polymerization of vinyl acetate is made up of:

| | Grams |
|---|---|
| Vinyl acetate | 100 |
| Benzoyl peroxide | 0.5 |
| Distilled water | 300 |
| Buffer solution (as in Example I) | 5 |
| Polymethacrylic acid | 1 |

By procedure analogous to that of Example I, polymerization is effected at a temperature of about 70° C. in about 3 hours. The polymer separated from the aqueous vehicle is agitated with an aqueous solution of sodium hexametaphosphate, 0.5% in strength, at 55° C. for 5 minutes. It is then separated from this solution, washed thoroughly with distilled water, and dried.

*Example IV.*—A batch for the granulation polymerization of vinyl acetate is made up of:

| | Grams |
|---|---|
| Vinyl acetate | 100 |
| Benzoyl peroxide | 0.5 |
| Distilled water | 150 |
| Buffer solution (as in Example I) | 5 |
| Filtrate from Example I | 150 |

Polymerization is effected as in Example III and the polymer separated from the aqueous vehicle is treated with sodium hexametaphosphate as in Example III.

*Example V.*—A batch for the granulation polymerization of styrene is made up of:

| | Grams |
|---|---|
| Styrene | 100 |
| Benzoyl peroxide | 0.5 |
| Distilled water | 300 |
| Buffer solution (as in Example I) | 5 |
| Polymethacrylic acid | 0.5 |

By procedure analogous to that of Example I, polymerization is effected at a temperature of about 93° C. in about 2 hours. The treatment of the resulting polymer is as in Example I.

*Example VI.*—A batch for the granulation polymerization of isobutyl methacrylate is made up of:

| | Grams |
|---|---|
| Isobutyl methacrylate | 100 |
| Distilled water | 300 |
| Buffer solution (as in Example I) | 2.5 |
| Polymethacrylic acid | 1 |

By procedure analogous to that of Example I, polymerization is effected at a temperature of about 75° C. in about one hour. The treatment of the resulting polymer is as in Example I.

*Example VII.*—The foregoing examples are all carried out using an aqueous solution of disodium phosphate, 0.7% in strength, for the removal of the adsorbed dispersion of granulating agent. The results obtained are comparable with those in the foregoing examples where the aqueous solution of sodium hexametaphosphate was used. A treatment lasting 15 minutes, at the respective temperatures disclosed in the examples, was sufficient.

It will be understood that the above examples are merely illustrative and that the present invention broadly relates to the treatment of granular polymers which have adsorbed any polyacrylic or polyalkacrylic acid. Polymethacrylic acid was used as the dispersing agent in Examples I, III, V, and VI and this same acid is believed to be present and functioning as the granulating agent in Examples II and IV. However, polyacrylic acid or one of the other polyalkacrylic acids such as polyethacrylic acid, either added as such or as a constituent of a filtrate from a previous polymerization of an acrylic or alkacrylic ester, may be used.

The proportions of the constituents of the reaction batch, i. e., polymerizable ethenoid monomer, catalyst, buffering agent, granulating agent, and water, are not relevant to the present invention, except insofar as they may affect the amount of granulating agent adsorbed and, hence, the details of the treatment required for its removal. Nor are the identities of the catalyst and buffering agent. In these respects the examples are merely illustrative of typical procedures.

The term "alkaline phosphates of alkali metals" is employed in its normal meaning to connote those salts of an alkali metal and a phosphoric acid which are of alkaline reaction. Monosodium phosphate is thus not included. On the other hand, other such salts may be used besides those mentioned in the examples such as sodium pyrophosphate and trisodium phosphate. The latter is, however, less desirable because its stronger alkalinity may tend to cause superficial decomposition of the polymer and foaming and, hence, delay in the draining of the solution from the polymer.

The sodium salts are preferred merely because of their lower cost. The salts of potassium and the other alkali metals may be used.

The strength of the solution of an alkaline phosphate, the temperature at which it is used and the time required for its action are, of course, interrelated and an effective or optimum combination will be established by simple experimentation. Ordinarily, the strength of the aqueous solution will range between about .01 and about 2 per cent, the temperature will be of the order of 50 to 95° C., heating is not essential but desirable, and the time required will be of the order of 2 to 30 minutes.

After the treatment with alkaline phosphate, the polymer should be washed to remove the salt. Distilled water will usually be used for this purpose since raw water may itself leave residues of haze-forming salts.

The present invention is broadly applicable to ethenoid compounds adapted to be polymerized in granular form. Among such compounds may be mentioned the esters of acrylic, methacrylic, and ethacrylic acids, vinyl esters including the halides, and styrene. While the invention is limited rather narrowly with respect to the granulating agent used, it is applicable to any granular poymer that is not itself subject to reaction with the alkaline phosphate of an alkali metal used.

Sodium hexametaphosphate has been recognized as an effective water-softener and, thus, as a valuable assistant in detergent treatments but its role in the process of the present invention is not in any way dependent upon this function; preferably, in the conduct of the process of the invention, distilled water, rather than raw water, is used and, hence, any water-softening capacity of the reagent is irrelevant.

Likewise, the heretofore known uses of disodium phosphate gave no clew to its effectiveness in the present process.

The process of the present invention removes, effectively and inexpensively, polymethacrylic acid, polyacrylic acid, and other polyalkacrylic acids from the surfaces of granules of polymers of ethenoid monomers made by granulation polymerization processes in which such acids have been used as dispersing agents. This removal is accomplished without damage to the polymer itself which, if properly washed thereafter, is of exceptional clarity and is free from tendency to be discolored by heat in molding operations as a result of a content of residual granulating agent.

As many apparently widely different embodiments of this invention may be made without departing from the spirit and scope thereof, it is to be understood that the invention is not limited to the specific embodiments thereof except as defined in the appended claims.

I claim:

1. Process comprising treating a granular polymer of methyl methacrylate having adsorbed thereon a polymeric acid from the group consisting of polymers of acrylic and alkacrylic acids, with an aqueous solution of an alkaline phosphate of an alkali metal, and, thereafter, washing said granular polymer with water until free from salt.

2. Process comprising treating a granular polymer of methyl methacrylate having adsorbed thereon a polymeric acid from the group consisting of polymers of acrylic and alkacrylic acids, with an aqueous solution of sodium hexametaphosphate, and, thereafter, washing said granular polymer with water until free from salt.

3. In the preparation of a granular polymer from a liquid ethenoid monomer from the group consisting of the esters of acrylic, methacrylic, and ethacrylic acids, vinyl esters, and styrene wherein the ethenoid monomer is dispersed in an aqueous vehicle containing, as a granulating agent, a polymeric acid from the group consisting of polymers of acrylic and alkacrylic acids, subjecting the monomer therein to polymerizing conditions, and separating the resulting granular polymer from said aqueous vehicle, the step comprising treating said granular polymer with an aqueous solution of an alkaline phosphate of an alkali metal.

4. In the preparation of a granular polymer from a liquid ethenoid monomer from the group consisting of the esters of acrylic, methacrylic, and ethacrylic acids, vinyl esters, and styrene wherein the ethenoid monomer is dispersed in an aqueous vehicle containing, as a granulating agent, a polymeric acid from the group consisting of polymers of acrylic and alkacrylic acids, subjecting the monomer therein to polymerizing conditions, and separating the resulting granular polymer from said aqueous vehicle, the step comprising treating said granular polymer with an aqueous solution of sodium hexametaphosphate.

5. In the preparation of a granular polymer from a liquid ethenoid monomer from the group consisting of the esters of acrylic, methacrylic, and ethacrylic acids, vinyl esters, and styrene wherein the ethenoid monomer is dispersed in an aqueous vehicle containing, as a granulating agent, a polymeric acid from the group consisting of polymers of acrylic and alkacrylic acids, subjecting the monomer therein to polymerizing conditions, and separating the resulting granular polymer from said aqueous vehicle, the steps comprising treating said granular polymer with an aqueous solution of an alkaline phosphate of an alkali metal, and, thereafter, washing said granular polymer with water until free from salt.

6. In the preparation of a granular polymer from a liquid ethenoid monomer from the group consisting of the esters of acrylic, methacrylic, and ethacrylic acids, vinyl esters, and styrene wherein the ethenoid monomer is dispersed in an aqueous vehicle containing, as a granulating agent, a polymeric acid from the group consisting of polymers of acrylic and alkacrylic acids, subjecting the monomer therein to polymerizing conditions, and separating the resulting granular polymer from said aqueous vehicle, the steps comprising treating said granular polymer with an aqueous solution of sodium hexametaphosphate, and, thereafter, washing said granular polymer with water until free from salt.

7. In the preparation of a granular polymer from a liquid ethenoid monomer from the group consisting of the esters of acrylic, methacrylic, and ethacrylic acids, vinyl esters, and styrene wherein the ethenoid monomer is dispersed in an aqueous vehicle containing, as a dispersing agent, polymethacrylic acid, subjecting the monomer therein to polymerizing conditions, and separating the resulting granular polymer from said aqueous vehicle, the step comprising treating said granular polymer with an aqueous solution of an alkaline phosphate of an alkali metal.

8. In the preparation of a granular polymer from a liquid ethenoid monomer from the group consisting of the esters of acrylic, methacrylic, and ethacrylic acids, vinyl esters, and styrene wherein the ethenoid monomer is dispersed in an aqueous vehicle containing, as a dispersing agent, polymethacrylic acid, subjecting the monomer therein to polymerizing conditions, and separating the resulting granular polymer from said aqueous vehicle, the steps comprising treating said granular polymer with an aqueous solution of sodium hexametaphosphate, and, thereafter, washing said granular polymer with water until free from salt.

9. Process comprising treating a granular ethenoid polymer from the group consisting of the esters of acrylic, methacrylic, and ethacrylic acids, vinyl esters, and styrene having adsorbed thereon a polymeric acid from the group consisting of polymers of acrylic and alkacrylic acids, with an aqueous solution of an alkaline phosphate of an alkali metal, and, thereafter, washing said granular polymer with water until free from salt.

10. Process treating a granular ethenoid polymer from the group consisting of the esters of acrylic, methacrylic, and ethacrylic acids, vinyl esters, and styrene having adsorbed thereon a polymeric acid from the group consisting of polymers of acrylic and alkacrylic acids, with an aqueous solution of sodium hexametaphosphate, and, thereafter, washing said granular polymer with water until free from salt.

BARNARD M. MARKS.

CERTIFICATE OF CORRECTION.

Patent No. 2,265,242.  December 9, 1941.

BARNARD M. MARKS.

It is hereby certified that error appears in the printed specification of the above numbered patent requiring correction as follows: Page 4, first column, line 7, claim 10, before the word "treating" insert --comprising--; and that the said Letters Patent should be read with this correction therein that the same may conform to the record of the case in the Patent Office.

Signed and sealed this 27th day of January, A. D. 1942.

(Seal)

Henry Van Arsdale,
Acting Commissioner of Patents.